UNITED STATES PATENT OFFICE.

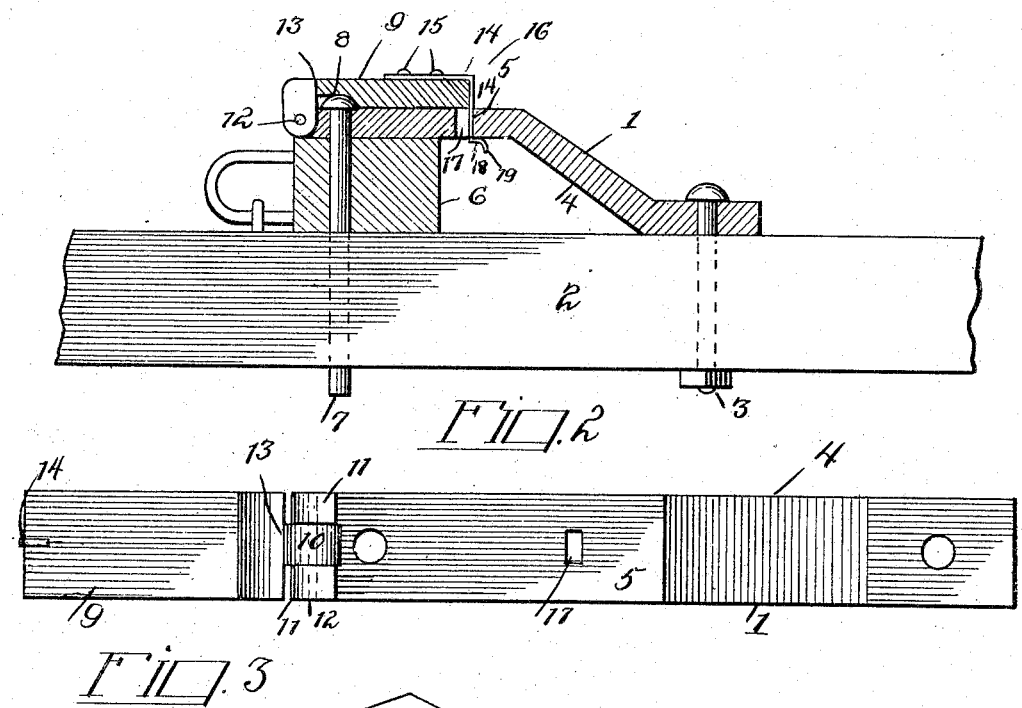

REES H. LEMMON, OF PERU, KANSAS.

HAMMER-STRAP.

947,109.  Specification of Letters Patent.  Patented Jan. 18, 1910.

Application filed October 23, 1909. Serial No. 524,175.

*To all whom it may concern:*

Be it known that I, REES H. LEMMON, a citizen of the United States, residing at Peru, in the county of Chautauqua and State of Kansas, have invented new and useful Improvements in Hammer-Straps, of which the following is a specification.

This invention is an improved safety double tree hammer iron for pivotally mounting a double tree on a tongue or pole so that the double tree can not become casually detached and for securing the pivot bolt of the double tree so that the said bolt can not become accidentally dislodged, the said invention consisting in the construction, combination and arrangement of parts hereinafter described and claimed.

In the accompanying drawings:—Figure 1 is a sectional view of a safety double tree hammer iron constructed in accordance with my invention, showing the same mounted on a wagon tongue or pole and in connection with the double tree and the pivot bolt of the latter. Fig. 2 is a detail top plan view of my improved safety double tree hammer iron, showing the locking arm thereof extended outwardly therefrom. Fig. 3 is a detail perspective view of the locking arm. Fig. 4 is a similar view of the body or main portion of the double tree hammer iron.

The hammer iron 1, in accordance with my invention, is secured at its rear end on the upper side of the tongue or pole 2 by means of a bolt 3 and has a forwardly and upwardly extending inclined portion 4 and a forwardly extending horizontal portion 5 which is spaced a suitable distance above the pole or tongue by the said inclined portion 4 so that the double tree 6 may be disposed on top of the tongue and directly under the said portion 5. A bolt or pin 7 is disposed in alining openings in the portion 5 of the hammer iron and in the double tree and tongue, the said bolt or pin serving as a pivot for the double tree and the head 8 of the said pin or bolt bearing on the upper side of the hammer iron.

The hammer iron is provided with a locking arm 9 which has at its front end a downwardly extending lug 10 which bears between a pair of lugs 11 at the front end of the hammer iron and is pivotally mounted by means of a pin or like device 12 in openings with which said lugs 10—11 are provided. Hence, the said locking arm is adapted to be disposed on the upper side of the front portion of the hammer iron as shown in Fig. 1 so as to bear on the upper end or head of the pivot 7 to lock the said pivot in place and prevent it from moving vertically and becoming accidentally disengaged from the tongue and double tree and the said locking arm is also adapted to be turned forwardly from the hammer iron as indicated in Fig. 2 so as to uncover the head of the pivot 7 and enable the latter to be readily removed. The said locking arm is provided on its under side near its pivotal end with a recess 13 for the reception of the head of the pivot.

To secure the locking arm in locking position, I provide the same with a spring catch 14 which is secured on the locking arm by screws or like devices 15. The said catch has a downwardly extending arm 16 which passes through a vertical opening 17 in the hammer iron and is formed with a locking shoulder 18 for engaging the underside of the said hammer iron and also with a thumb piece 19 to facilitate the disengagement of the spring catch from the hammer iron.

It will be understood that when the locking arm is closed on the hammer iron and over the head of the pivot, the spring catch automatically engages the hammer iron so as to securely lock the locking arm in such position. It will be understood that the locking arm effectually secures the pivot 7 in place and prevents the pivot from becoming casually detached from the double tree and tongue.

Having thus described the invention, what is claimed as new, is:—

1. A double tree hammer iron having an opening for the reception of the pivot of a double tree and further provided with a lock arm, said locking arm being pivotally connected to said hammer iron and adapted to be disposed thereon and on the said pivot and to be opened out from the hammer iron so as to uncover the pivot and permit the removal of the latter.

2. A double tree hammer iron having an opening for the reception of a double tree pivot pin or bolt and further provided with a pivoted locking arm to bear on said double tree pivot bolt, the said locking arm having a spring catch to engage said hammer iron and secure said locking arm in locking position.

In testimony whereof I affix my signature in presence of two witnesses.

REES H. LEMMON.

Witnesses:
   J. R. McNABB,
   EVA CRIPPEN.